Figure 1A:
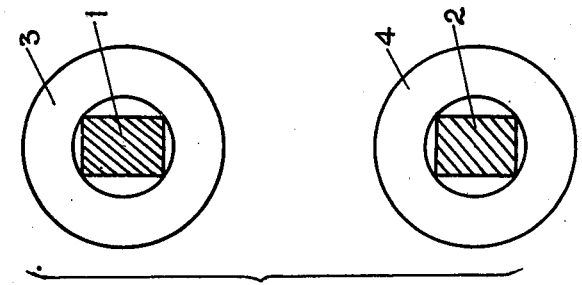

July 5, 1949.  L. LEVY  2,475,190
RADIO DIRECTION FINDER
Filed May 6, 1939  8 Sheets-Sheet 1

INVENTOR
LUCIEN LEVY
BY Richards & Geier
ATTORNEYS

July 5, 1949.　　　　　L. LEVY　　　　　2,475,190
RADIO DIRECTION FINDER

Filed May 6, 1939　　　　　　　　　　　　8 Sheets-Sheet 2

INVENTOR
LUCIEN LEVY
BY
Richards & Geier
ATTORNEYS

July 5, 1949.　　　　　　L. LEVY　　　　　　2,475,190
RADIO DIRECTION FINDER
Filed May 6, 1939　　　　　　　　　　　　8 Sheets-Sheet 3
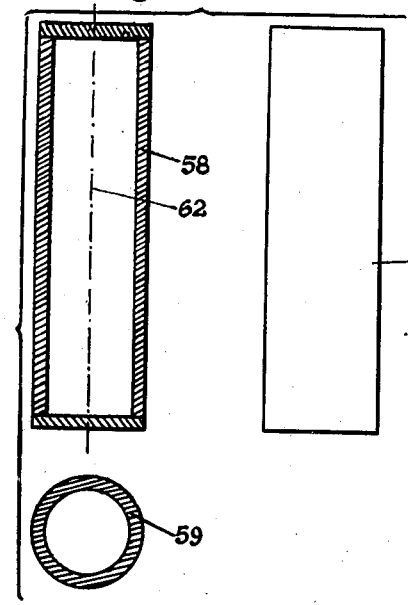
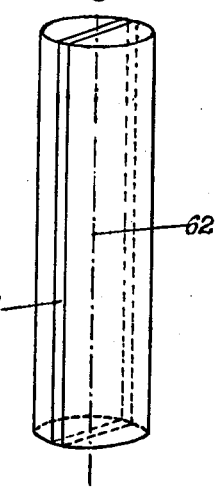
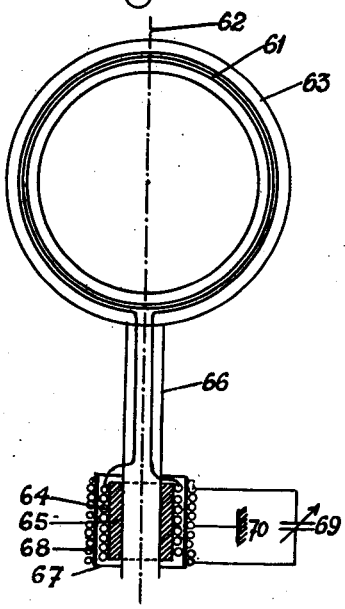
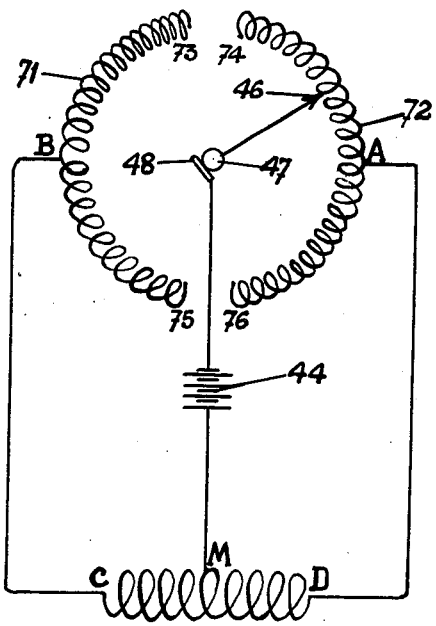
INVENTOR
LUCIEN LEVY
BY Richardson Geier
ATTORNEYS

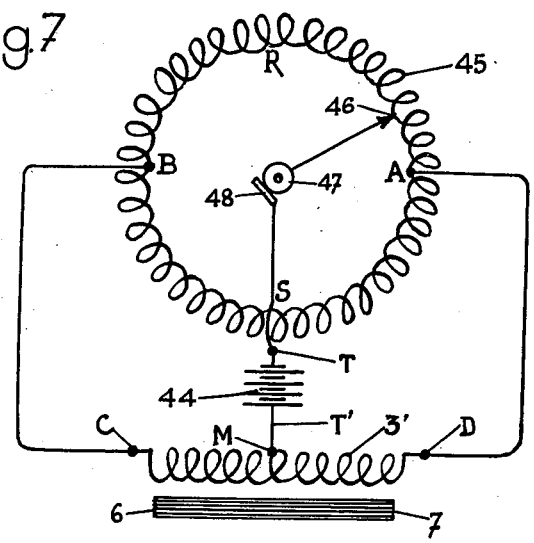
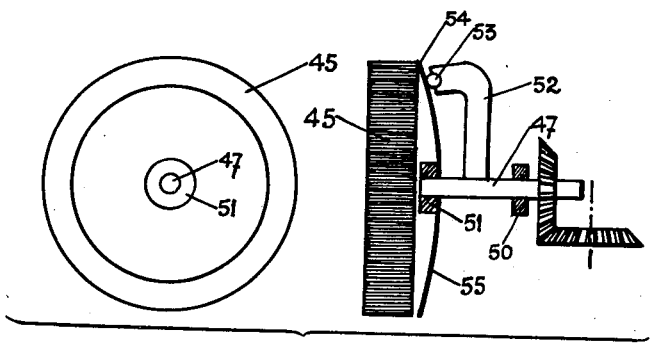
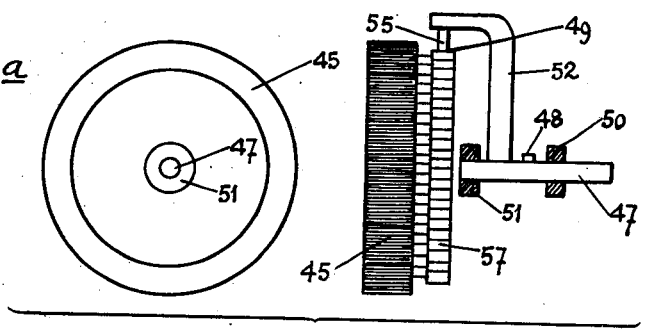

July 5, 1949.  L. LEVY  2,475,190
RADIO DIRECTION FINDER

Filed May 6, 1939  8 Sheets-Sheet 5

INVENTOR
LUCIEN LEVY
BY
ATTORNEYS

July 5, 1949.  L. LEVY  2,475,190
RADIO DIRECTION FINDER
Filed May 6, 1939  8 Sheets-Sheet 6

INVENTOR
LUCIEN LEVY
BY
ATTORNEYS

July 5, 1949.　　　　　L. LEVY　　　　2,475,190
RADIO DIRECTION FINDER
Filed May 6, 1939　　　　　　　　　　　8 Sheets-Sheet 7
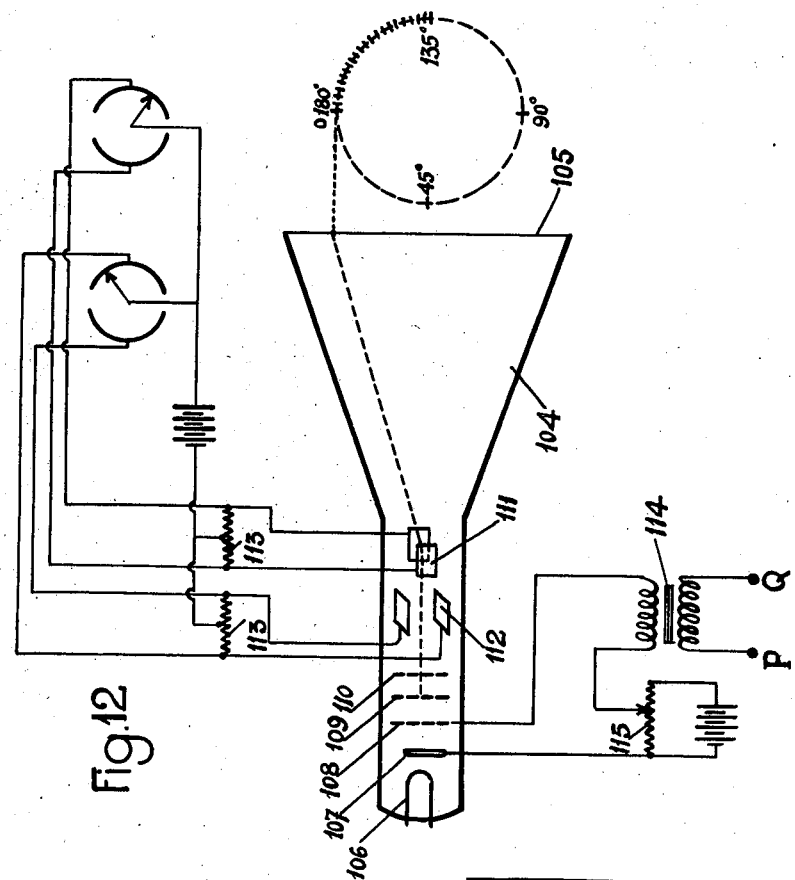
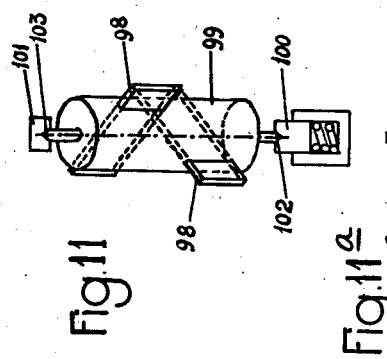
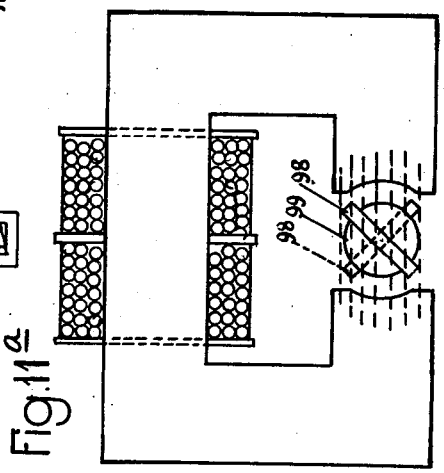
INVENTOR
LUCIEN LEVY
BY
ATTORNEYS

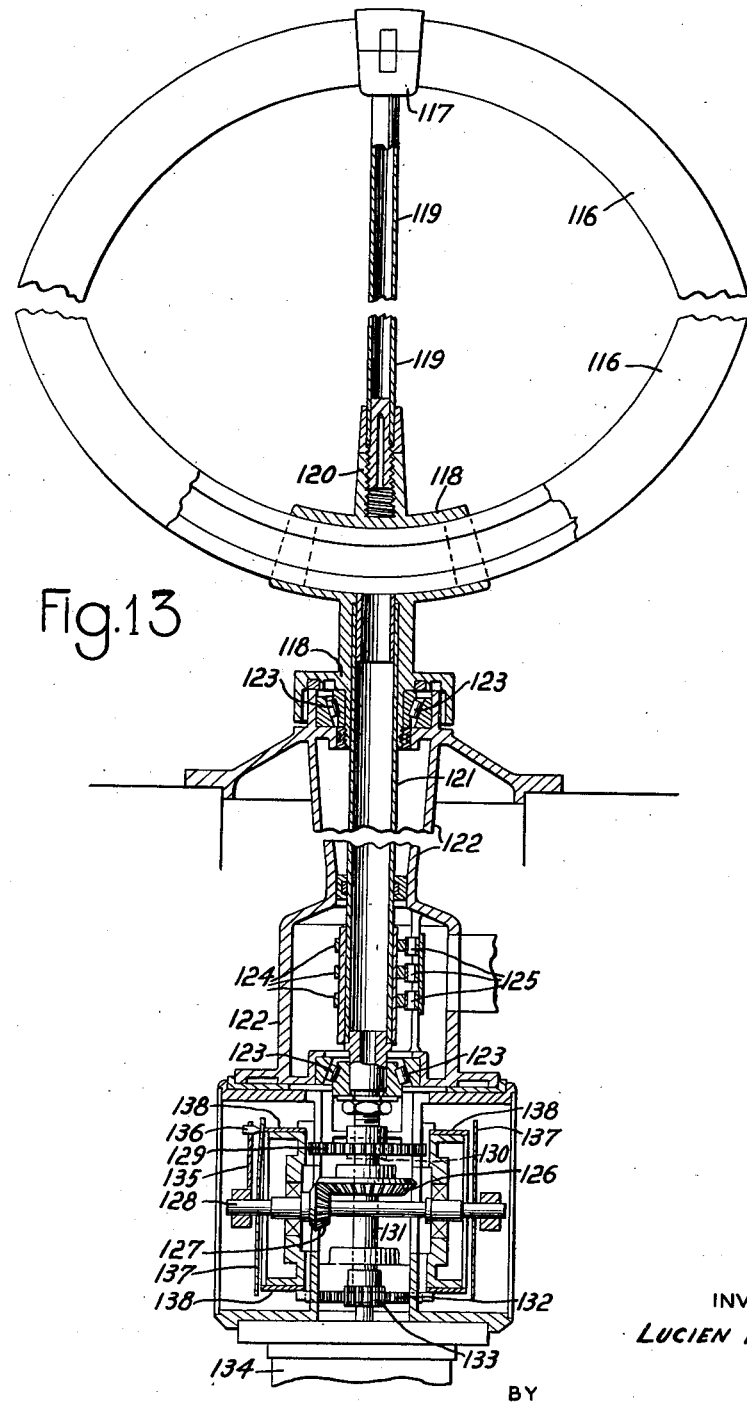

Patented July 5, 1949

2,475,190

UNITED STATES PATENT OFFICE 2,475,190

RADIO DIRECTION FINDER

Lucien Levy, Paris, France; vested in the Attorney General of the United States

Application May 6, 1939, Serial No. 272,238
In France May 13, 1938

Section 3, Public Law 690, August 8, 1946
Patent expires May 13, 1958

3 Claims. (Cl. 343—113)

In a patent U. S. A. Lucien Levy No. 1,844,859 of February 9, 1932, an automatic direct reading direction finding system was described, comprising in combination:

1. A device for exploring the field (real or fictitious frame rotating at a frequency $f$);
2. A generator of polyphase alternating currents (generally two-phase currents of a frequency of $2f$) the rotor of which generator is fixed on the spindle of the rotating frame;
3. An amplifier and detector which amplifies the high frequency currents modulated at the frequency of $2f$, obtained from the frame, and which converts said high frequency currents by detection into a current of the low frequency of $2f$, which frequency is then amplified and supplied to the phase-meter;
4. A moving coil phase-meter, the moving coil of which is supplied with the currents of $2f$ frequency from the amplifier, whereas the fixed coils are supplied with the two-phase currents from the alternator.

The present invention, of which M. Lucien Levy is the author, relates to improvements in this system and more particularly to:

The alternating current generator,
The indicator (electromagnetic or electronic phase-meter),
The rotating frame,
The amplifier and detector and the electric coupling circuit between said amplifier and the indicator.

As regards the generator of alternating current of $2f$ frequency, it was previously indicated that it should be directly fixed on the spindle of the rotating frame and that it should be given a number of poles per phase double that of the frame (viz. four poles per phase: two north and two south). In the improved device, in order to decrease the weight and facilitate construction, use is preferably made of a generator which rotates at double the speed of the frame to which it is mechanically coupled by a set of gears (usually bevel gears of 2:1 ratio).

Said generator may be very simply formed by a group of two magnetos having a two-pole rotating armature, the armatures being set in such a manner that their planes of symmetry passing through their respective axes are orthogonal. It may of course also be formed by any usual two-phase alternator having a fixed field winding or by two single-phase alternators.

The phase-meter, as is known, involves various constructional difficulties, the chief of which will be referred to hereinafter:

The phase-meter is generally formed by a wound frame mounted on pivots in the rotor space of a two-phase field. Said frame is therefore in a rotor space in which there is a rotating field. According to the theory of the phase-meter, the swinging frame and the pointer connected to it are in the suitable position for indicating the exact dephasing of the current in said frame with respect to the current in one of the stator coils taken as the origin of the phases when the torque acting on the frame is nil.

It ensues from the foregoing that hitherto, for constructing the moving coil phase-meter, it was necessary, owing to the rotating field of the stator due to the two two-phase field windings, to avoid any metal part in the construction of the swinging frame which would produce a torque (as in an asynchronous motor); furthermore, the swinging frame has to be constructed with very thin wire and to be connected in a high resistance circuit. All these conditions make the construction delicate and prevent satisfactory efficiency; since the swinging coil of the phase-meter is very small and the winding very thin, the whole arrangement is fragile, difficult to construct and the wire is liable to break. On the other hand, it is impossible to construct a winding which has sufficient resistance to be adapted to the output tube of the vacuum tube amplifier, in the plate circuit of which tube the winding is inserted. The use of an adapting transformer could not therefore be considered hitherto, since the placing of the frame across the low resistance winding of the transformer would have produced a disturbing torque of asynchronous nature which would continuously rotate the frame.

In the improved phase-meter which is the object of the invention, all these drawbacks are eliminated. Instead of forming the moving system of the phase-meter by means of a single wound frame, two wound frames are mechanically connected together (for example are arranged one above the other on one and the same vertical spindle provided with pivots) and are simultaneously supplied (in series or in parallel) with the alternating current of which it is desired to ascertain the phase. Each of the frames is arranged alone in a magnetic field, for example a horizontal magnetic field produced by an electromagnet, one of the two magnetic fields being 90° out of phase relatively to the other and the two frames forming complementary angles with their respective fields. By way of example, if the two out of phase fields are parallel, the two frames are orthogonal. Under these conditions, the moving system formed by the two frames as a whole has a well defined position of equilibrium (corresponding to a zero total torque), which position may be used to measure the dephasing of the current.

The theory of the phase-meter thus constructed is as follows:

If the current which supplies one of the stator coils viz. $I_0 \sin \omega t$ is taken as the origin of the phases, the current of the other is $I_0 \cos \omega t$ and the magnetic fields of the field windings are $H_1 = kI_0 \sin \omega t$ and $H_2 = kI_0 \cos \omega t$.

If $\alpha'$ is the angle between the axis of symmetry of the frame perpendicular to its plane and the direction of the corresponding stator field, the torques on each of the frames are respectively $C_1 = M_1 H_1 \sin \alpha'$ and $C_2 = M_2 H_2 \cos \alpha'$, $M_1$ and $M_2$ being the magnetic moments of the frames which are assumed to be in series and through which the current $I_1 \sin (\omega t + \alpha)$ whereof it is desired to measure the phase angle $\alpha$ is assumed to flow. Said moments are given by the formulae:

$$M_1 = KI_1 \sin (\omega t + \alpha)$$
$$M_2 = KI_1 \sin (\omega t + \alpha)$$

The instantaneous torque is therefore:

$$C = C_1 + C_2 = kKI_1 I_0 \sin (\omega t + \alpha) \sin \omega t \sin \alpha'$$
$$+ kKI_1 I_0 \sin (\omega t + \alpha) \cos \omega t \cos \alpha'$$

and by writing $kKI_1 I_0 = A$ $$C = A \sin (\omega t + \alpha) \cos (\omega t + \alpha')$$

By applying the known trigonometrical formula, the instantaneous total torque may be written in the form:

$$C = \frac{1}{2} A [\sin (2\omega t + \alpha + \alpha') + \sin (\alpha - \alpha')]$$

Since the integration of the first term during the period $$T = \frac{2\pi}{\omega}$$

produces a zero torque, it will be seen that the mean total torque cancels out for $\alpha = \alpha'$. Consequently, the moving system will on the average be in equilibrium when it has rotated an angle $\alpha$ equal to the angle $\alpha'$ by which the electric current is to be measured is out of phase.

The system therefore enables a phase-meter to be constructed without a rotating stator field, each of the frames being in an alternating field which is stationary in space. It is consequently possible to supply the two frames as a whole by means of a step-down transformer which adapts the low impedance of the two frames to the high impedance of the output tube of the amplifier, thereby producing the optimum efficiency. On the other hand, owing to the heavy induced currents produced by any swinging of the frames in their respective magnetic field because of the low resistance across which they are connected, a quick damping of the oscillations of the movable system is obtained which may even be made absolutely aperiodic. Finally, the rotating hysteresis error is also eliminated.

In order to increase the intensity of the torque, each of the frames is wound on a pile of magnetic sheet iron discs, or better on a small cylinder made of powdered iron agglomerated with an insulating material, such as those used in radio-electricity, but wherein the iron granules are of larger diameter.

It should be observed that, although it was stated that the currents of which it is desired to measure the phase are to be supplied to the rotor, the apparatus can on the contrary be used by supplying each of the movable frames with one of the two two-phase currents and the two fixed windings with the current of which it is desired to ascertain the phase.

Similarly, the phase-meter need not only be used with two-phase current, but also with polyphase current, and it is possible not only to measure one dephasing, but a plurality of dephasings. This may be necessary, in particular if it is desired to ascertain the exact bearings of a transmitter by means of a plurality of automatic direction finding receiving stations; in this case (real or fictitious) rotating frames are arranged at different spots and are provided with their respective amplifiers, and their indications are sent by wire or by wireless to the central station where the phase-meter is located. For this purpose, it suffices for the transmitting station to modulate a carrier wave by means of the currents of $2f$ frequency supplied by the amplifier detector, and to receive at the central station the modulated high frequency currents which are then amplified, detected and supplied to the phase-meters. This phase-meter of these phase-meters are provided with a plurality of movable systems; it is possible to construct phase-meters having a plurality of pointers which intersect at the position of the transmitter.

In this case, the phase-meters may be of small size and each be fixed on a support which enables their axis to be arranged in such a manner as to coincide on a map with their geographical position. The indicating pointers are replaced by light beams produced by a small optical device (tiny projectors with parallel rays), and the tracks of which on the map intersect at the point corresponding to the transmitter.

An improved phase-meter according to the invention together with its application to the construction of an improved automatic direction finder will now be described by way of example.

Figure 2:
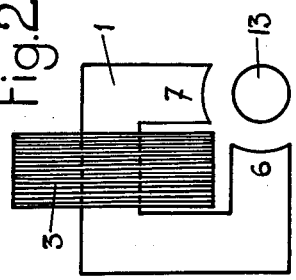
Figure 1:
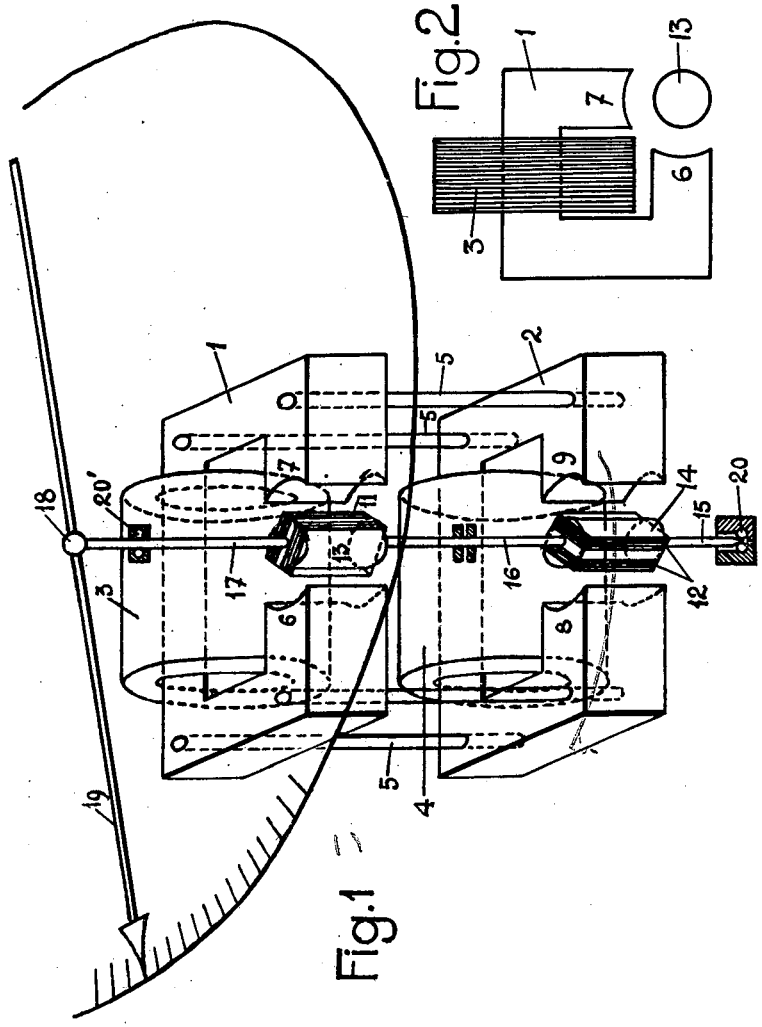
Figure 3:
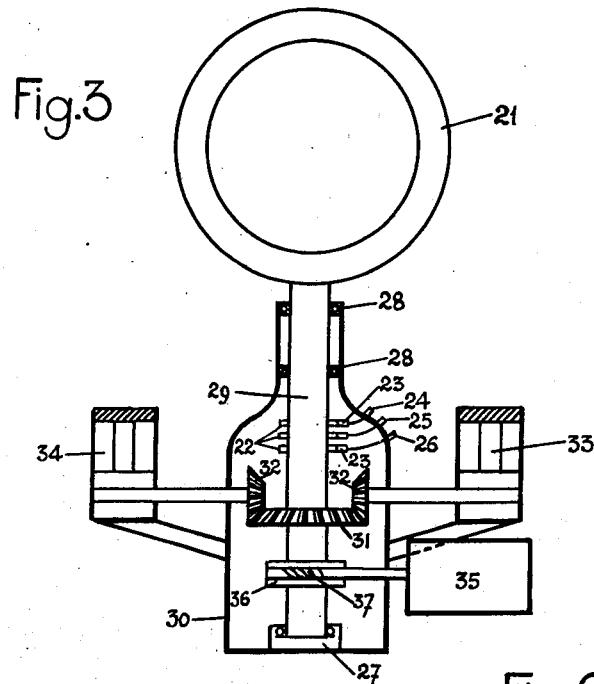
Figure 6:
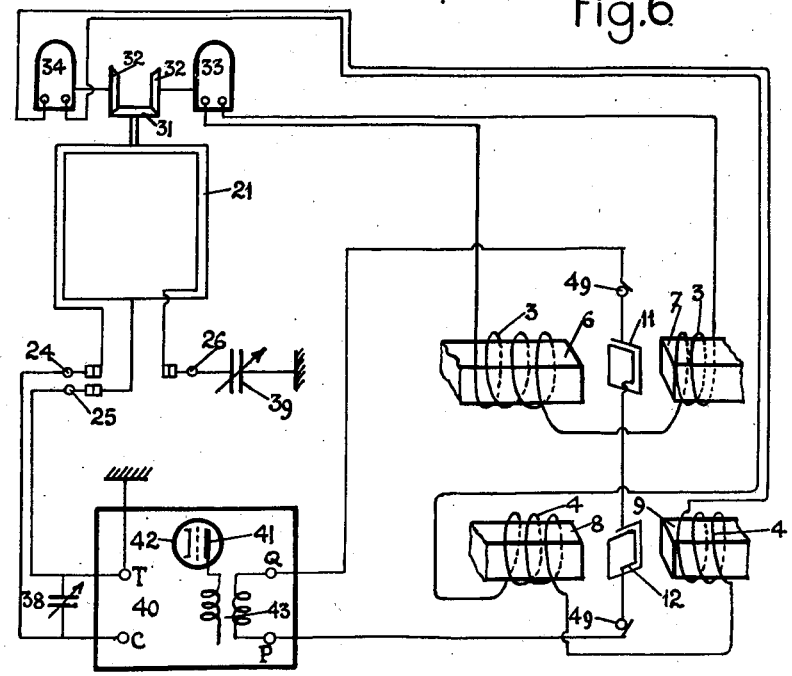
Figure 9:
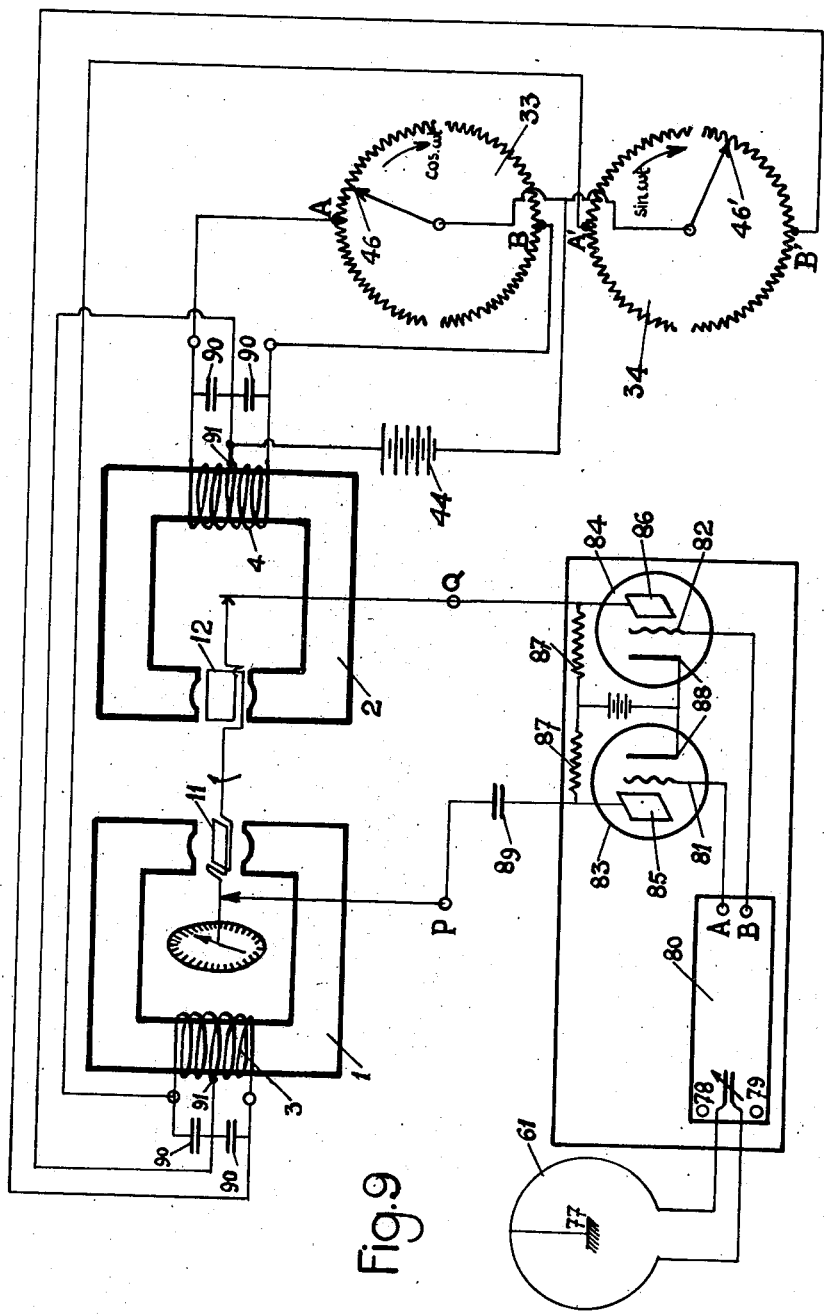
Figure 10:
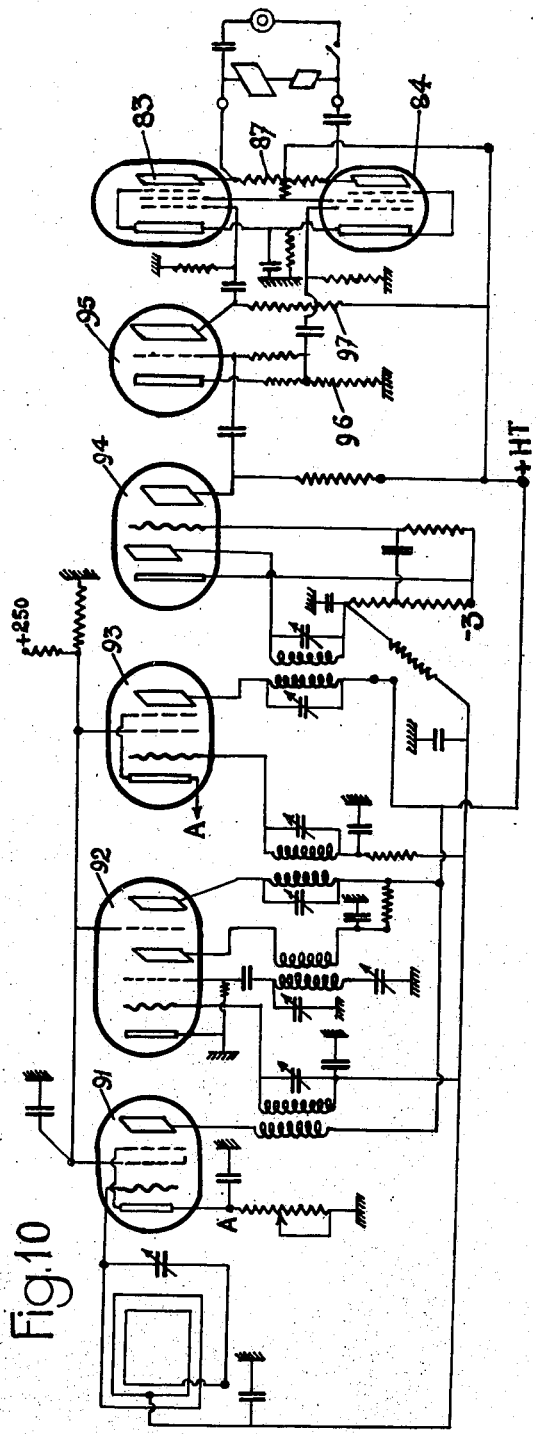
Figure 10:
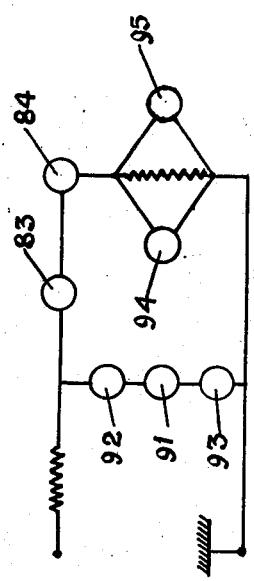

Fig. 1 of the accompanying drawings shows this phase-meter diagrammatically; Fig. 1a shows the transverse section of same. Fig. 2 is a diagram illustrating an arrangement of magnetic poles. Fig. 3 is partly a section showing a rotating frame. Fig. 4 illustrates a powdered iron cylinder. Fig. 4a shows the drum winding of a frame. Fig. 5 is a diagram illustrating another rotary frame. Fig. 6 is a wiring diagram of a direction finder. Fig. 7 illustrates diagrammatically an A.C. generator. Fig. 7a shows a generator of a different construction. Fig. 8 shows a different generator. Fig. 8a shows a generator having fixed commutators. Fig. 9 is the wiring diagram of an indicator. Fig. 10 is the wiring diagram of a superheterodyne receiver. Fig. 10a is a diagram illustrating a bridge connection. Fig. 11 illustrates a magnetic cylinder. Fig. 11a shows a magnetic circuit in plan view. Fig. 12 is a diagram illustrating a phase meter. Fig. 13 shows a rotating frame with an alternator.

As can be seen in Fig. 1, 1 and 2 are two horizontally arranged magnetic circuits provided with windings 3 and 4. The four columns 5 make the two magnetic circuits integral. Between the poles 6, 7 and 8, 9 are arranged the two frames 11 and 12, the planes of which are orthogonal and which are directly wound on the agglomerated powdered iron or ferro-nickel cylinders 13 and 14, the axes of which coincide with that of the steel spindle 15—16—17. Said spindle rotates between a ball step-bearing 20 and a ball bearing 20', which are fixed on metal plates respectively secured to the lower face of the circuit 2 and to the lower face of the circuit 1. The spindle 15—16—17 carries, at 18, the indicating pointer 19 which moves over a graduated dial. The coils 3 and 4 are supplied with the two-phase currents and the two frames are supplied, in series, with the current whereof the phase is to be measured.

The horizontal dial, in front of which the pointer moves through an angle of 360°, may be divided either into 360° corresponding to the electrical dephasing between the measured current and the field coil current supplied in the form of a sine wave, or into 180° corresponding to the geometrical angle which defines the position of the transmitter (geographical angle). In fact, as the frame has two maximum and two minimum points per revolution, a half-revolution (viz. 180° geographical degrees) corresponds to a complete modulation of the high frequency current, that is to say to a complete period of the modulated current, or to 360° of electrical dephasing.

If it is desired that the real angle through which the pointer moves should repeat the geographical angle, it suffices to arrange on the one hand, the poles 6 and 7, and on the other hand the poles 8 and 9, in such a manner as only to embrace respectively an angle of 90° instead of 180°. Fig. 2 shows this arrangement diagrammatically.

Fig. 3 shows an embodiment of the rotating frame which may be combined with the phasemeter for the construction of the improved direction finder. The shielded frame 21 carries on its spindle three rings 22 which are connected to the two ends and to the centre-point of the winding; the three brushes 23 that rub against said rings are connected to the terminals 24, 25 and 26. Two ball bearings 28 and a step-bearing 27 enable the tubular support 29 of the frame to rotate in the cast aluminum case 30.

On the tube 29 are fixed: 1, a bevel gear 31 which drives two pinions 32 actuating the two generators 33 and 34 which are 90° out of phase relatively to each other; and 2, a gear 36 driven by a worm 37 which is actuated by the electric motor 35. The two generators and the motor are fixed on or in the case.

A particularly advantageous embodiment of the rotating frame in view of the increasing speed of aeroplanes enables a very small frontal resistance to be obtained. This embodiment of the frame proper comprises a winding of a few turns about a hollow cylinder which is made of iron (or ferro-magnetic metal) powder agglomerated with an insulating material and which may be provided with closure discs of the same diameter which are likewise made of agglomerated powder and are cemented on its ends. The winding follows the two outer generatrices of the cross-section of the cylinder in the same manner as a drum winding of a dynamo.

A frame of cylindrical shape can thus be obtained of a few centimetres diameter, which rotates about its own axis of symmetry. Said frame can readily be made to rotate inside a fixed casing which decreases to a maximum extent the frontal resistance thereof which is already reduced relatively to the other shape of the frame. The cylindrical shape of the hollow tube could of course be replaced by any shape of revolution about the axis of rotation.

Owing to the use of iron powder, spherules of the order of 1 micron, agglomerated by an insulating material (as known in radio) the overvoltage coefficient of the oscillating circuit of the frame may be of the order of 200 or 300.

Furthermore, when the plane of the frame is directed towards the transmitting station, a special dephasing effect is obtained between the voltage induced in the front wires and in the rear wires of the frame owing to the interposition of the powdered iron cylinder in the path of the wave.

As a result of these two effects, the area of the frame can be decreased to a very great extent in this other embodiment of the frame, relatively to the ordinary frame and with an identical receiving sensitivity, for example it can be reduced to ¼ or to ⅕ to the usual area.

The decrease of frontal resistance will therefore be considerable at the same time as the high quality of the frame (overvoltage) enables a valuable selectivity to be obtained. Finally, the cylindrical shape enables the frame to be made very strong at the same time as it enables the weight to be decreased owing to the decrease in the stresses applied to the frame. The first idea which suggests itself for constructing a rotating frame is to wind the wire on a hollow cylindrical former made of powdered iron, special agglomerate for high frequency, the turns being perpendicular to the generatrices of the cylinder, and to make the frame rotate about an axis perpendicular to the axis of the cylinder. It is found that this method, which is excellent when there is no former made of agglomerated iron powder, is useless as soon as the hollow iron cylinder is introduced into the winding. In this case, during the rotation, the deformation of the field by rotation of the iron prevents the reception from becoming zero for a predetermined position.

This is not the case if the agglomerated powdered iron former is a body of revolution about the axis of rotation. In this case, the rotation of the iron circuit does not produce any deformation of the field of the wave to be received. As the winding itself takes up more or less inclined positions relatively to the front of the wave, the modulation of the wave takes place correctly, as with a frame without iron.

Fig. 4 shows a diametrical section 58, a transverse section 59 and an elevation 60 of the powdered iron cylinder.

Fig. 4a shows the drum winding of the frame 61, the axis of rotation of the frame being 62.

It is obvious from the foregoing that although the cylindrical shape is convenient for the powdered iron core of the frame, any shape of revolution about the axis of rotation is likewise suitable and in particular the spherical shape.

Whether the usual rotating frame is used or the novel rotating frame described above, the brushes which rub against the rings are always required to collect, during the rotation, the electromotive force induced in the wires of the frame by the hertzian waves. Said brushes are liable to produce momentary defective contacts during the rotation, which creates noises in the receiver. A novel improvement according to the present invention consists in connecting the frame across an inductance coil or across a capacity which rotates with said frame and in magnetically or electrostatically coupling the coil or the capacity with a suitable impedance which is stationary in space relatively to the axis of the frame. For example, the frame is provided at its lower part with a solenoid winding having as its axis of symmetry the axis of rotation of the frame about which it itself rotates. A second co-axial winding of slightly different diameter is coupled as rigidly as possible by induction.

Fig. 5 shows a frame 63 which rotates about the axis 62. Its winding 61 is connected at its ends to those of the coil 64 wound about the axis 62 on the hollow powdered iron cylinder 65.

The hollow cylinder 65 is coaxially fixed on the supporting tube 66 for the frame. The coaxial fixed coil 67 which is provided with the winding 68 is induced by the winding 64 and is connected to the tuning condenser 69. Its neutral point is connected to the ground 70.

Fig. 6 shows the general arrangement and the electric diagram of the direction finder, the same reference numerals indicating the same parts as previously in Fig. 3. The centre-tapped frame 21 is provided with the tuning condenser 38 and with the balancing condenser 39 connected to the ground. The terminals 24 and 25 are connected to the terminals CT of the amplifier 40 of the superheterodyne type, of which P and Q are the output terminals. Said amplifier amplifies the high frequency currents which are modulated at low frequency first of all optionally at the initial frequency, then, after each change of frequency, at a supersonic frequency. After detection, audio-frequency amplification is optionally applied. The plate circuit 41 of the output tube 42 of the amplifier is provided with a high ratio (10 for example) step-down transformer 43, so as to adapt the resistance of the swinging frames 11, 12 of the phase-meter to the dynamic resistance of said plate circuit. Said transformer supplies the two frames 11, 12 by means of the rings 49 provided with fixed brushes. The generator 33—34 of two-phase current rotating at a frequency double the frequency of rotation of the frame, supplies the fixed coils of the electromagnets 6—3, 7—3 and 8—4, 9—4.

Fig. 7 shows the principle of a novel alternating current generator, which can be used to supply one of the fixed coils of the phase-meter in the case in which it is desired to obtain a minimum weight and bulk (on an aeroplane for example). Said two-phase generator involves the use of two identical devices, the sliders of which are displaced 90°. It operates as a converter for the direct current of the accumulator 44, the terminals of which are T and T'. 45 is a winding of resistance or other wire wound in toric shape (AR, AS), which may or may not possess a toric iron core and is provided with two tappings A and B at the ends of the same diameter. 3' denotes the winding of an electromagnet (that of a fixed coil of the phase-meter for example) having a centre-tap M. The two ends C and D of said winding are connected to A and B. A slider 46 rotates about the spindle 47 on which rubs a brush 48. The slider 46 comes into contact, during its rotation, with the successive convolutions of the winding. The accumulator 44 thus alternately supplies the windings CM and MD through the impedances 46 RB and 46 A. It will be understood that between C and D a substantially sinusoidal alternating voltage develops which alternates at the rate of one period per revolution of the slider.

Similarly, by means of a toric ring, it would be possible, by supplying by means of the accumulator points located at 90° instead of 180° and which are alternately positive and negative, to obtain a frequency corresponding to two periods per complete revolution of the slider.

In order to increase the efficiency of the conversion, the previous arrangement may be modified according to Fig. 7a. Two resistances 71 and 72 are wound in semi-toric formation on one and the same toric insulating former. A and B are the centre points of said resistances which are made of very resistant thin wire adjacent 73, 74, 75, 76 and of wire of gradually increasing diameter towards A and B. The points 73 and 74, and 75 and 76 are not connected two by two, so that there is no harmful shunt when the battery 44 is connected to each of the windings CM and MD alternately.

Fig. 8 shows diagrammatically an embodiment of the generator.

Along the axis of the torus 45 is arranged the spindle 47 which rotates in bearings 50 and 51 and is provided with an arm 52 carrying a ball 53 at the end thereof. The flexible chromium steel disc 55, under the action of the thrust of the ball, comes into contact at 54 with the toric winding 45 and, owing to the rotation of the arm, the point 54 (corresponding to the point 46 of Fig. 7) moves over the successive convolutions are bared at the point of contact.

Fig. 8a shows another embodiment involving the use of a fixed commutator 57, the successive elements of which are connected to the toric winding 45 at equidistant points. The brush 55 is moved by the rotating arm 52; its point of contact 54 corresponds to the point 46 of Fig. 7. A brush 48 is in contact with the rotary spindle 47.

As regards the amplifier detector which amplifies the high frequency currents from the frame, it is advantageous to use a superheterodyne, it should be observed that if audio-frequency amplification is applied after the second detection, precautions must be taken to prevent the angle found on the indicator from being dependent on the amplitude of the waves collected by the frame, which is due to the distorsion introduced by the amplification.

It is essential, and this is one of the characteristic points of the improved device, to actuate the indicator by a group of two multi-electrode tubes wherein the grids with respect to each other, and the plates with respect to each other, are respectively two by two in phase opposition, the moving coil or spot of the indicator being actuated for example by the voltage across the two plates.

Fig. 9 shows the wiring diagram of the indicator (phase-meter). The frame 61 has its centre point 77 connected to the ground and its ends connected to the input terminals 78, 79 of the superheterodyne 80, wherein A and B are at potentials which are of double the frequency of rotation of the frame and are 180° out of phase. The grids 81 and 82 of the amplifying tubes 83 and 84 are connected at A and B. In the hot cathode-plate circuits 85—88 and 86—88 are arranged the resistances 87.

The rotor of the phase-meter 11, 12 is arranged in shunt between the two plates 85 and 86 with the interposition of the direct current blocking condenser 89. In parallel with the two wound frames 11, 12, as a whole, are arranged in series between the two plates 85 and 86, the two resistances 87 through each of which passes the plate-cathode current of the corresponding tube.

The windings 3 and 4 are supplied by the generator 33, 34 at voltages which are sin $\omega t$ for one and cos $\omega t$ for the other, 33 and 34 being preferably of the type described with reference to Fig. 7a. Said windings are each provided with a centre tap 91 connected to one of the poles of the battery 44, the two ends of the winding being alternately connected to the other pole through the alternately variable resistance located between the rotary sliders 46, 46' and the centre points AB and A'B'. Condensers 90 improve the sinusoidal form of the current of the generator.

Fig. 10 shows by way of example the diagram of a superheterodyne amplifying and detecting receiver actuating the phase-meter without error of amplitude and enabling damped or continuous wave radiotelegraphic or radiotelephonic stations to be heard simultaneously.

It comprises:

1 pentode radio-frequency amplifying tube 91.
1 frequency changer 92.
1 pentode intermediate frequency amplifying tube 93.
1 diode triode detector audio-frequency amplifying tube 94.
1 triode audio-frequency amplifying phase-reversing tube 95.
2 pentode audio-frequency amplifying tubes 83, 84 in phase opposition.

The heating filaments are supplied by the 24 volt aeroplane battery by means of two bridges as shown in the diagram in Fig. 10a.

It will be observed that as the first detection of the superheterodyne takes place in the tube 92, and the frequency 2f which actuates the indicator is directly produced by the second diode detector 94 at the same time as the musical or telephone frequency, they are simultaneously amplified by the tubes 83, 84. The tube 95 reverses the phase of the voltage applied to the grid of the tube 83 relatively to the voltage applied to the grid of the tube 84. In fact, the plate circuit, HT ground, cathode has in series the equal resistances 86 and 87 and the cathode and the plate therefore have equal and opposite potentials relatively to the ground. Said potentials are each respectively applied to one of the grids of the two output tubes 83 and 84 of the receiver-amplifier.

As a characteristic point of this receiver, it will be observed that the circuit of the tubes 94, 95 and 96: 1, only includes resistances and capacities and 2, that the coupling capacities between the plate 94 and the grid 95 are sufficiently large for the amplification of the frequency 2f (about 10 periods) to be effected at the same time as that of the musical (telephone or telegraph) frequency, the frequency 2f and the musical frequency both coming from the detection by the diode 94. By directly amplifying the frequency 2f by means of 94, 95 and 83, 84, a much greater power is available for actuating the phase-meter than by amplifying at musical frequency first and detecting a third time to reveal the frequency 2f (this is due to the fact that in this latter case, the low output of energy from the third final detection is involved).

The purpose of the improvements of the phase-meter is to obtain a constant sensitivity of same in all positions of the pointer for any variation of the dephasing.

For this purpose, it is indispensable for the variation of induction, when the rotor rotates, to be absolutely sinusoidal, this requiring the field in the air-gap of each of the field magnets to be absolutely uniform and the lines of force between the two poles to be straight lines perpendicular to the surface of the poles as shown in Fig. 11. It is preferable for obtaining these conditions to eliminate the magnetic cylinder of the frame and to wind each of the two rotor windings on a thin insulating frame 98. The two thin wound frames are arranged orthogonally in two slots of an insulating supporting cylinder 99 (made of ivory, Bakelite, etc.) which rotates between two step-bearings 100, 101, on which it bears through iridioplatinum points 102, 103. The current is supplied to the whole of the rotor through the points 102, 103 and one of the step-bearings 100 is mounted on a spring so as to produce a constant pressure on the contacts.

Fig. 11a is the plan view of one of the two magnetic circuits provided with its field winding and of the rotor of the phase-meter.

In the case in which it is desired to obtain quick indications of the radio compass for transmissions of short duration, the inertia of the moving system of the phase-meter may be too great to give satisfaction. In this case, the electromagnetic phase-meter is replaced by an electronic phase-meter.

Fig. 12 shows the diagram of an electronic phase-meter formed by a low tension cathode-ray oscillograph 104 (similar to those used in television). This tube is provided with the fluorescent screen 105, the hot filament 106, the cathode 107, the light grid 108, the concentrating anode 109 and the anode 110, the usual circuit of which has not been completely drawn.

The horizontal deviation plate 111 and the vertical deviation plate 112 are respectively connected to the two phases of the two-phase alternator: a sinusoidal voltage is applied to one of the groups of plates and a cosinusoidal voltage is applied to the other, the contre-tapped coils 3 and 4 are each replaced by a group of two equal impedances 113 in series. The output of the amplifier PQ is coupled, as is usual in television, by the transformer 114 to the Wehnhelt electrode which varies the luminosity of the light spot. For adjusting the light potentiometer 115, arrangements are made for the luminosity of the spot to be in general small when it describes on the fluorescent screen the circle which is produced by the action of the two two-phase voltages on the scanning plates. When the voltage of 2f frequency from the receiver is near the maximum, the spot becomes luminous and a very luminous point which replaces the pointer of the indicator appears on the small luminosity circle of the screen on which a concentric circle graduated in degrees may be drawn as in the case of the electromagnetic phase-meter.

It is obvious that instead of the electric device with deviation plates of the cathode-ray tube, it would have been possible to use two orthogonal electromagnets similar to the electromagnets 1 and 2 in Fig. 9, which create two fields transverse to the cathode beam and are orthogonal with respect to each other.

Fig. 13 is an axial section of an embodiment of a rotating frame with an improved alternator. On the screened frame 116 of toric shape are fixed two sleeves 117 and 118 which respectively carry a rod 119 which is threaded at its lower part and a nut 120 which enables the screened frame 116 to be placed under tension. This placing under tension has the advantage of preventing the frame from vibrating.

Said frame 116 is carried by the hollow shaft 121 which is adapted to rotate in the case 122 on roller bearings 123. Three rings 124 which are carried by the shaft 121 are connected to the two ends and to the mid-point of the winding. Three brushes 125 rub against said rings.

On the shaft 121 are also fixed on the one hand a bevel gear 126 which, through the pinion 127, drives the shaft 128 that actuates the two-phase generators, and on the other hand the gear 129 which, through the pinion 130, the shaft 131 and the gears 132 and 133, is actuated by the motor 134. The two-phase generators are of the type shown in Fig. 8, that is to say are provided with an arm 135 fixed on the shaft 128 and carry a projection 136 which bears on a flexible disc 137 adapted to come into contact with the winding 138.

With the devices described, the phase-meter only indicates the direction of the wave received and not the direction from which it comes, concerning which there consequently exists a doubt of 180°. In order to remove the doubt in a simple manner, the following method will be used if it is desired to direct the aeroplane towards the transmitting station.

Having turned the axis of the aeroplane in the direction of the transmitting station (that is to say the phase-meter pointing at 0°) the pilot turns his rudder so as to bring the axis of the aeroplane into the position perpendicular to the direction of the transmitting station (that is to say the phase-meter pointing at 90°). As the aeroplane moves, the pilot has to act constantly on the rudder to keep the phase-meter on the 90° mark. If he has to turn the aeroplane towards the right, this is because the transmitting station is on the right, if he has to turn the aeroplane towards the left, this is because the transmitting station is on the left.

In order to turn into the direction of the transmitting station, it suffices for the pilot to bring the phase-meter reading back to 0° by accentuating the operation required by the phase-meter to remain at 90°.

In order to make these operations easy on the pilot phase-meter, the 90° position is provided with a coloured section, the appearance of which indicated the position for which doubt is removed and the zero position is provided with the reproduction of a plan view of an aeroplane.

When the apparatus described are fitted on board aeroplanes, the rotor of the phase-meter may be provided either with a rotating rose which moves in front of a mark, or with a pointer which moves in front of a graduation. It is recommended to provide the pilot phase-meter with a graduated rose on which an aeroplane is drawn, which makes the yaws visible to the pilot.

What I claim and desire to secure by Letters Patent of the United States is:

1. In an electric direction finding device, having a superheterodyne amplifier detector and two generators producing a two-phase current of 2f frequency, a phase-meter comprising two separate magnetic circuits, each of said magnetic circuits being connected to a separate generator, and two separate wound frames, each of said wound frames being connected to the other wound frame and to said superheterodyne amplifier-detector and being subjected to the action of a single magnetic circuit.

2. The device in accordance with claim 1, wherein the two wound frames of the phase meter are orthogonally disposed, said frames comprising an insulating cylinder, windings carried by said cylinder, ball bearings, and means carried in said ball bearings and firmly connected with said cylinder, said means constituting a spindle.

3. In an electric direction finding device, having a superheterodyne amplifier-detector and two generators producing a two-phase current of 2f frequency, a phase meter comprising two separate magnetic circuits and two separate wound frames, each of said wound frames being connected to the other wound frame and being subjected to the action of a single magnetic circuit; means connecting each of said magnetic circuits to a separate generator to supply one circuit with current of the form $\sin \omega t$ and the other circuit with current of the form $\cos \omega t$, and means connecting said wound frames to said superheterodyne amplifier-detector for supplying the wound frames with the current the phase of which is to be measured.

LUCIEN LEVY.

REFERENCES CITED

The following references are of record in the file of this patent:

UNITED STATES PATENTS

| Number | Name | Date |
|---|---|---|
| 982,930 | Bliss | Jan. 31, 1911 |
| 1,183,881 | Koppitz | May 23, 1916 |
| 1,774,458 | Tear | Aug. 26, 1930 |
| 1,820,647 | Brown | Aug. 25, 1931 |
| 1,844,859 | Levy | Feb. 9, 1932 |
| 1,982,689 | Polydoroff | Dec. 4, 1934 |
| 2,151,917 | Hyland | Mar. 28, 1939 |
| 2,174,350 | Montu | Sept. 26, 1939 |
| 2,229,461 | Kummich | Jan. 21, 1941 |